Patented Nov. 28, 1922.

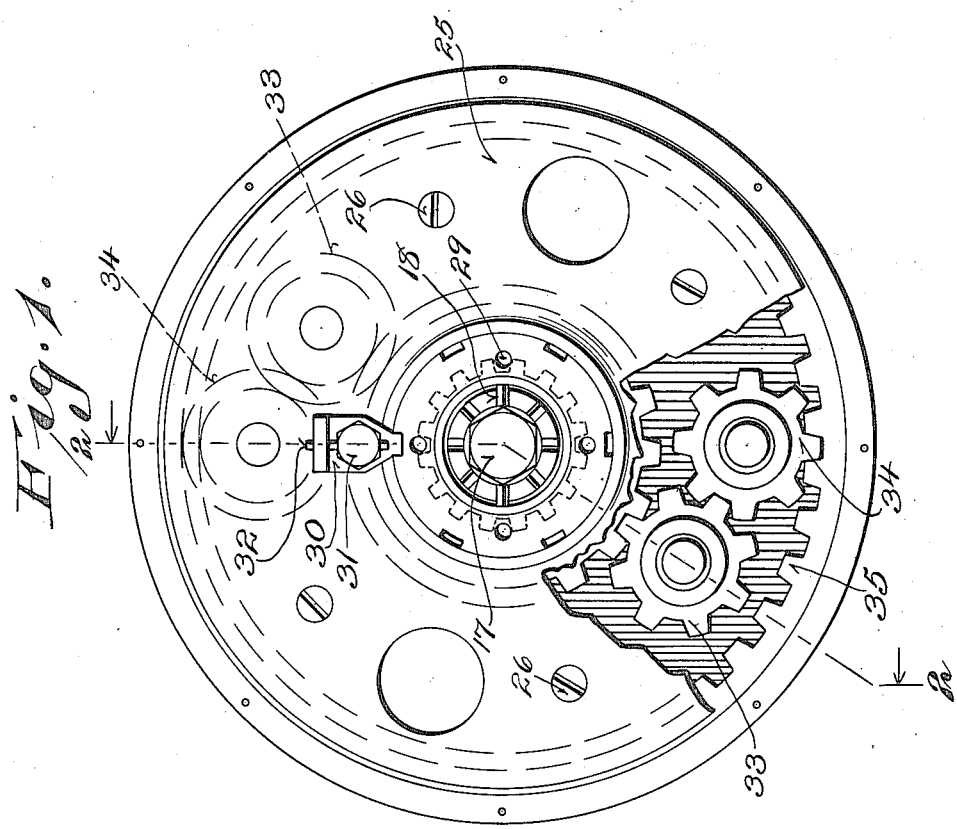

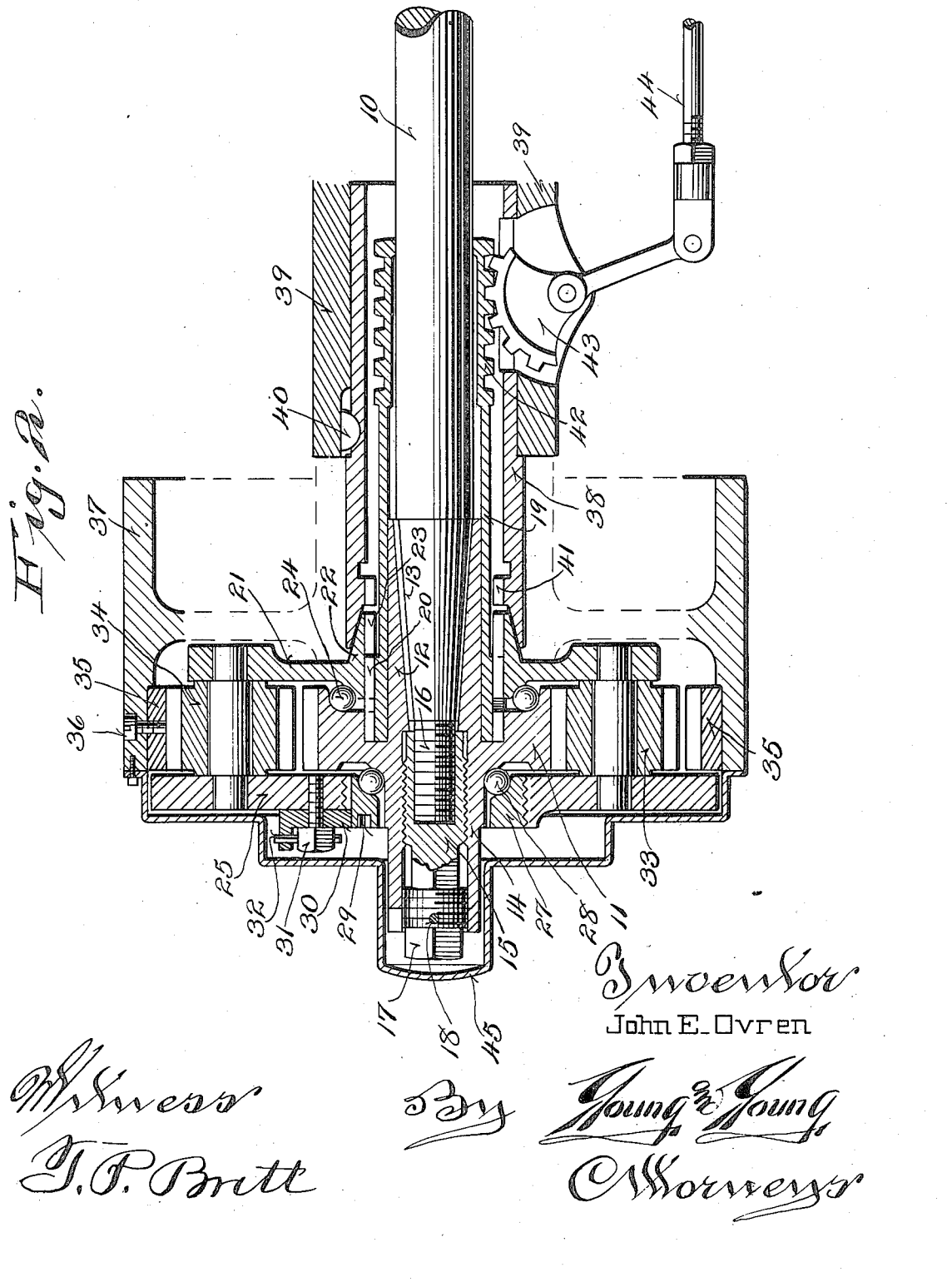

1,436,817

UNITED STATES PATENT OFFICE.

JOHN E. OVREN, OF STOUGHTON, WISCONSIN, ASSIGNOR OF ONE-HALF TO JOKUM JOHNSON, OF STOUGHTON, WISCONSIN.

TRANSMISSION MECHANISM.

Application filed February 14, 1921. Serial No. 444,849.

*To all whom it may concern:*

Be it known that I, JOHN E. OVREN, a citizen of the United States, and resident of Stoughton, in the county of Dane and State of Wisconsin, have invented certain new and useful Improvements in Transmission Mechanism; and I do hereby declare that the following is a full, clear, and exact description thereof.

This invention relates to improvements in transmission mechanism, particularly those which are used between the driving axle and the wheel of a tractor or other motor vehicle. The principal object of the invention is to provide a transmission mechanism, which will be simple in construction and positive in operation, and while it is especially adapted for motor vehicles of a heavy type, it is apparent that the same mechanism may be used in any type of vehicle, or in fact, in any kind of machinery wherein it is desired to provide a speed changing mechanism.

The invention will be described with reference to the drawings, in which

Figure 1 is a side elevation, parts being broken away.

Figure 2 is a sectional view on the line 2—2 of Figure 1.

Similar reference characters denote similar parts in each of the views.

Numeral 10 denotes the drive shaft or the axle of a motor vehicle. On this axle a driving gear 11 is carried, the said gear being provided with a hub 12, which is keyed to the axle as shown at 13. Extending from the other side of the gear 11 is the internally threaded hub 14. A plug 15 is screwed into the hub 14 and on to the threaded end 16 of the axle. This plug is held in place by a lock nut 17, which is held in position by a pin 18. A sleeve 19 is slidably and rotatably mounted on the hub 12 and is provided at one end with the peripheral clutch teeth 20. A disc 21 is centrally mounted on the sleeve 19 and is formed with the hub 22, having the clutch teeth 23 which engage with the teeth 20. The disc is spaced from the gear 11 by the anti-friction ball-bearings 24.

On the other side of the gear 11 is mounted a disc 25, the same being secured by the screws 26 to disk 21. Threaded into the center of the disc 25 and surrounding the hub 14 is a bearing member 27, which is adjustable against the ball-bearings 28, the adjustment being accomplished by means of a spanner wrench inserted in the holes 29. The bearing member 27 is held in its adjusted position by the member 30, which is secured by the bolt 31 and pin 32. The discs 21 and 25 carry a plurality of pairs of planetary pinions 33 and 34, one pinion of each pair meshing with a drive gear 11 and the other member meshing with the ring gear 35, the latter being secured by the screws 36 to the wheel or driven member 37, which is revolubly mounted in any suitable manner on the stationary housing 38. This housing is secured in fixed relation to the frame 39 by any suitable means, such as the lug 40. The housing 38 is provided with teeth 41, with which the teeth 20 are adapted to engage when the sleeve 19 is moved to the right. The means for moving the sleeve 19 longitudinally consists of annular grooves 42 formed in the end of said sleeve, and a segmental rack 43, which is pivoted on the frame 39 and operable by the link 44. The transmission mechanism is protected by the housing 45, which is secured to the rim of the wheel 37.

I claim:

1. In combination, a drive shaft, a drive gear mounted to rotate therewith, a stationary housing surrounding said drive shaft, a wheel journalled on said housing, a driven gear fixed to said wheel, a plurality of planetary pinions arranged in pairs, each pair connecting said drive gear with said driven gear, means for supporting said pinions and means for selectively locking said pinion supporting means to said drive gear for direct drive, or for holding it stationary for a lower speed.

2. In a mechanism of the class described, a drive axle, a wheel therefor, a drive gear rotatable with the axle, a stationary housing surrounding said drive shaft, a wheel journalled on said housing, a driven gear fixed to said wheel, rotatable idler pinions connected with the driving and driven gears, revoluble means for supporting said pinions and means for selectively holding the supporting means against revolving, or for locking the supporting means to the driving gear to rotate therewith.

3. In combination, a drive shaft, a drive gear mounted to rotate therewith, a stationary housing surrounding said drive shaft, a wheel journalled on said housing, a driven gear fixed to said wheel, pinions connecting said drive gear with said driven gear, means for supporting said pinions, clutch teeth on said drive gear, on said pinion supporting means, and on said housing, a sleeve slidably and rotatably mounted on said drive shaft, clutch teeth on said sleeve at all times engaging the teeth on said pinion supporting means, and means for shifting said sleeve to bring its teeth also into engagement with teeth on said drive gear or said housing selectively.

4. In combination, a drive shaft, a drive gear mounted to rotate therewith, a stationary housing surrounding said drive shaft, a wheel journalled on said housing, a driven gear fixed to said wheel, pinions connecting said drive gear with said driven gear, means for supporting said pinions, clutch teeth on said drive gear, on said pinion supporting means, and on said housing, a sleeve slidably and rotatably mounted on said drive shaft, clutch teeth on said sleeve at all times engaging the teeth on said pinion supporting means, means for shifting said sleeve to bring its teeth also into engagement with teeth on said drive gear or said housing selectively, said last named means including annular grooves on said sleeve, and a rock arm having teeth engaging said grooves.

In testimony that I claim the foregoing I have hereunto set my hand at Dallas in the county of Dallas and State of Texas.

JOHN. E. OVREN.